United States Patent [19]

Rousey

[11] Patent Number: 4,495,707
[45] Date of Patent: Jan. 29, 1985

[54] BIDIRECTIONAL PLUMB BOB LEVEL

[76] Inventor: James R. Rousey, Rte. 1, Box 193J, Eatonville, Wash. 98328

[21] Appl. No.: 580,661

[22] Filed: Feb. 16, 1984

[51] Int. Cl.³ .............................................. G01C 15/10
[52] U.S. Cl. ....................................................... 33/392
[58] Field of Search ................... 33/391, 392, 393, 395, 33/402, 350

[56] References Cited

U.S. PATENT DOCUMENTS

| | | |
|---|---|---|
| 377,434 | 2/1888 | Marshall ............................... 33/392 |
| 713,789 | 11/1902 | Newman . |
| 753,354 | 3/1904 | Brown . |
| 761,430 | 5/1904 | Vreeland . |
| 1,256,435 | 2/1918 | Buczkowski . |
| 1,952,745 | 3/1934 | Deasy ................................... 33/392 |
| 2,720,705 | 10/1955 | Vincent . |
| 3,521,369 | 7/1970 | Jones . |

FOREIGN PATENT DOCUMENTS

255203  3/1964  Netherlands .......................... 33/393

Primary Examiner—Harry N. Haroian
Attorney, Agent, or Firm—Seed and Berry

[57] ABSTRACT

A plumb bob level with a casing having sidewalls rigidly connected together by upper and lower end walls; a bobbin positioned below the upper end wall and having a flexible line wrapped therearound and extending longitudinally within the casing toward the lower end wall, the bobbin being selectively and lockably rotatable to adjust the length of the line; a plumb bob with longitudinal upper and lower end portions and an enlarged midportion therebetween, the upper end portion being secured to the line and the lower end portion having a pointed tip in proximity and alignment with a cross-hair target formed on the lower end wall, the plumb bob being free-swinging for movement in all directions responsive to the angular orientation of the casing with respect to true vertical. The level also has transparent front and rear face plates attached to the casing, with the front plate having several sections which are separately removable and leaving a lower portion of the casing open for grasping of the plumb bob. The casing also has a first and second gusset plates positioned toward the lower end wall and intermediate the plumb bob upper and lower end portions, with apertures sized large enough to prevent free-swinging of the plumb bob during normal usage but small enough to prevent the plumb bob from swinging into contact with the sidewalls or face plates. The gusset plates are transparent and extend between the sidewalls for maintaining the spacing therebetween. Additional gusset plates are also provided between the guide plate and the second gusset plate to maintain the spacing between the sidewalls.

33 Claims, 7 Drawing Figures

BIDIRECTIONAL PLUMB BOB LEVEL

DESCRIPTION

1. Technical Field

The present invention relates generally to plumb bob levels, and more particularly, to a bidirectional plumb bob level.

2. Background Art

In the past, there have been various efforts to manufacture plumb bob levels; however, many problems have been encountered which affect the utility of the level. One such problem is warpage of the case walls, which makes it difficult to obtain an accurate reading. Similarly, the lack of rigidity of the case walls can produce inaccuracies. In instances where it has been attempted to solve the warpage and rigidity problems, the user's view of the plumb bob, the string from which it is suspended, and the target used in conjunction with the plumb bob has been impaired, and the efficiency and effectiveness of the level have therefore been reduced. Other problems have been providing for easy adjustment of the bob-line length to accommodate line stretching and relaxation, and maintaining the bob-line centered within the case relative to the target.

While it is desirable to enclose the plumb bob level to protect it from weather, the enclosure makes it difficult to remove the plumb bob for replacement or inspection, and prevents steadying of the plumb bob in preparation for its use.

It will therefore be appreciated that there is a significant need for a bidirectional plumb bob level which, from a single reading, can determine if two perpendicularly oriented surfaces, such as a corner, are plumb, while providing easy viewing of the plumb bob, the bob-line, and the target. The level should have an enclosed, rigid, warpage-free case, means for easy adjustment of the bob-line length, means for centering the bob-line independent of the length adjustment means used, means for easy plumb bob replacement, and means for steadying the plumb bob in preparation for use of the level. The level should also have means for preventing the plumb bob from swinging into contact with the case walls and for preventing the plumb bob from traveling within the case should the level be turned upside-down. The present invention fulfills these needs and further provides other related advantages.

DISCLOSURE OF INVENTION

The present invention resides in a plumb bob level, including a rigid casing having two parallel, spaced-apart, elongated sidewalls and spaced-apart upper and lower end walls, at least the lower end wall being positioned at the longitudinal end of the sidewalls and oriented perpendicular to both of the sidewalls. The sidewalls and at least the lower end wall each have two opposed parallel edges defining outwardly facing front and rear surfaces perpendicular to the sidewalls and at least the lower end wall. The level further includes a plumb bob suspension means positioned toward the upper end wall for supporting a bob-line extending longitudinally therefrom within the casing toward the lower end wall, and an elongated plumb bob with longitudinal upper and lower end portions. The upper end portion of the plumb is suspended from the bob-line at a position toward the lower end wall for positioning a pointed tip of the lower end portion in proximity and alignment with a cross-hair target formed on an interior surface of the lower end wall. The plumb bob is free-swinging for movement in all directions responsive to the angular orientation of the casing with respect to true vertical. The level also has front and rear face plates attached to the casing and extending between the sidewalls to at least partially enclose the casing, at least one of the face plates being transparent to permit substantially uninhibited viewing into the casing. A first retainer member is positioned toward the lower end wall and intermediate the plumb bob upper and lower end portions, with an aperture having the plumb bob positioned therein. The aperture is sized large enough to permit free-swinging of the plumb bob during normal usage but small enough to prevent the plumb bob from swinging into contact with the sidewalls or face plates. A second retainer member is positioned above the first retainer member and has an aperture size large enough to permit free-swinging of the plumb bob during normal usage but small enough to prevent the plumb bob from passing therethrough when the level is inverted.

The level further has a guide member positioned toward the upper end wall below the suspension means. The guide member has an aperture laterally aligned with the cross-hair target and having the bob-line extending therethrough to maintain the bob-line laterally centered within the casing relative to the target. The aperture is sized large enough to permit free passage of the bob-line therethrough but small enough to substantially inhibit lateral movement of the line therein. The plumb bob has an enlarged midportion between the upper and lower end portions, and the second retainer member is positioned intermediate the plumb bob upper end portion and midportion, with the plumb bob positioned in the second retainer member aperture and the aperture sized to prevent the plumb bob midportion from passing therethrough when the level is inverted.

In the presently preferred embodiment of the invention, the upper and lower end walls rigidly connect the sidewalls together, and the first and second retainer members and the guide member extend between the sidewalls for maintaining the spacing therebetween. Each of the sidewalls further includes a pair of spaced-apart, longitudinally extending, interior flanges recessed inward from the sidewall edge surfaces and against which the front and rear face plates are positioned. The casing is formed as an integral unit, preferably of metal.

In the presently preferred embodiment, the first and second retainer members are gusset plates, and the guide member is a plate extending between the sidewalls for maintaining the spacing therebetween and having an approximately 1/16-inch diameter bore hole therethrough for receiving the bob line. The level further includes longitudinally spaced-apart third and fourth gusset plates positioned between the guide plate and the second gusset plate. The third and fourth gusset plates each extend between the sidewalls for maintaining the spacing therebetween and have an aperture with the bob-line extending therethrough. The aperture is sized large enough to permit uninhibited movement of the bob-line as the plumb bob swings free during normal usage. The guide plate and the first, second, third, and fourth gusset plates are transparent and supportably retained within laterally extending slots in the flanges. Both the front and rear face plates are also transparent.

The front and rear face plates each have an outward surface positioned substantially coplanar with the front and rear casing surfaces, respectively. The rear face plate extends the entire length of the casing between the upper and lower end walls. The front face plate has an upper removable section extending from the upper end wall to the guide plate. The plumb bob suspension means is a selectively rotatably shaft for adjusting the length of the bob-line to adjust the longitudinal position of the plumb bob within the casing. The shaft extends through and is rotatably supported by the upper plate section of the front face plate, and is selectively locked against rotation by a lock nut positioned exterior of the upper plate section and threadably attached to a threaded end portion of the shaft. The shaft has a second lock nut positioned interior of the upper plate section and threadably attached to the shaft threaded end portion to bind the upper plate section between the first and second lock nuts to selectively allow rotation of the shaft for adjusting the bob-line length. The shaft also has an exterior end face slotted for turning the shaft. The shaft is also received in and rotatably supported by an aperture in the rear face plate. The shaft or bobbin has the bob-line wrapped thereabout, and the guide aperture of the guide plate maintains the bob-line laterally centered with the cross-hair target regardless of the position of the line on the shaft.

At least an upper portion of the sidewall flanges toward the front casing surface against which the upper plate section is positioned is recessed inward of the front casing surface sufficient to maintain the exterior lock nut at or inward of the front casing surface. The upper plate section extends downward to immediately above the guide plate. The front face plate also has a midsection extending from the guide plate to a position above the second gusset plate. The front face plate also includes a lower removable section extending from a position above the second gusset plate, adjacent to the plate midsection, to the first gusset plate. The casing below the lower plate section is maintained open for easy access to the plumb bob by the user of the level to steady the plumb in preparation for use. The lower plate section extends to overlap a front edge of the first and second gusset plates to maintain them in their respective slots in the flanges. A midportion of the sidewall flanges located toward the front casing surface and against which the plate midsection is positioned, is positioned outward of the recessed upper flange portions, and holds the outward surfaces of the midsection and lower section of the front face coplanar with the front casing surface. The plate midsection extends to overlap a front edge of the guide plate to maintain the guide plate in its slots in the flanges.

Other features and advantages of the invention will become apparent from the following detailed description, taken in conjunction with the accompanying drawings.

BEST MODE FOR CARRYING OUT THE INVENTION

Figures 1, 2, 3:
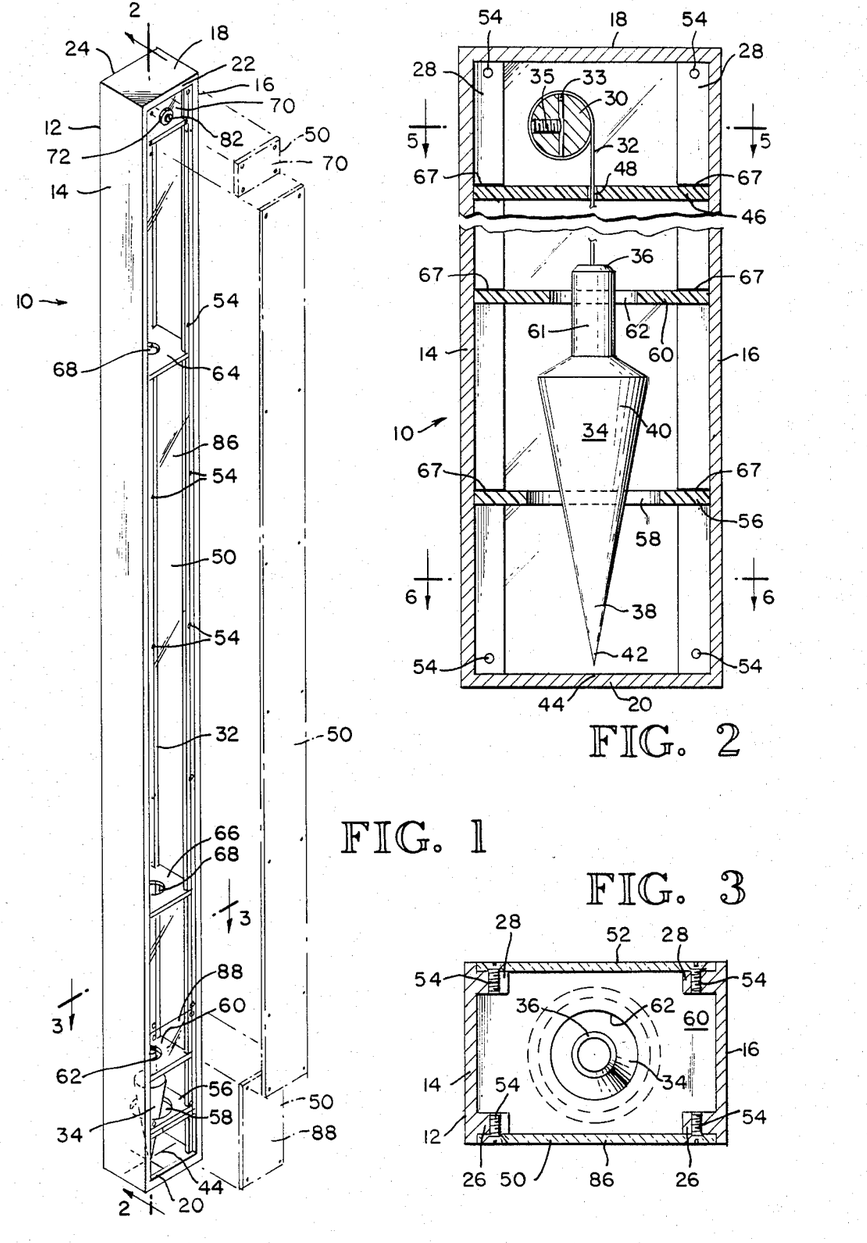
FIG. 1 is an isometric view of a plumb bob level embodying the present invention, showing the front face plate in phantom lines and removed from the casing.
FIG. 2 is an enlarged fragmentary, sectional view taken substantially along the line 2—2 of FIG. 1.
FIG. 3 is an enlarged sectional view taken substantially along the line 3—3 of FIG. 1.
Figures 4, 5, 6:
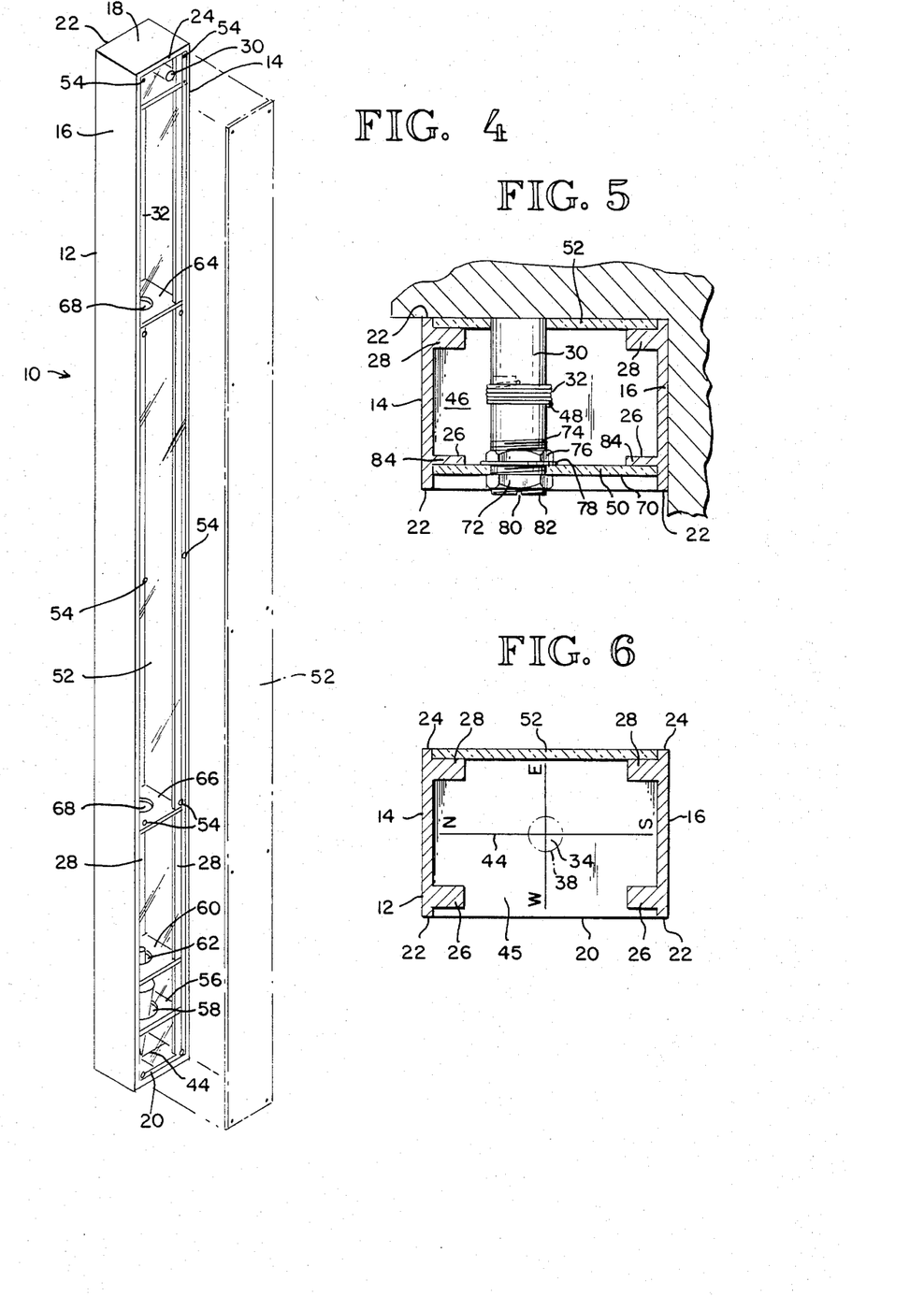
FIG. 4 is an isometric view of the rear of the plumb bob level of FIG. 1, showing the rear face plate in phantom lines and removed from the casing.
FIG. 5 is a sectional view taken substantially along the line 5—5 of FIG. 2.
FIG. 6 is a sectional view taken substantially along the line 6—6 of FIG. 2.
Figure 7:
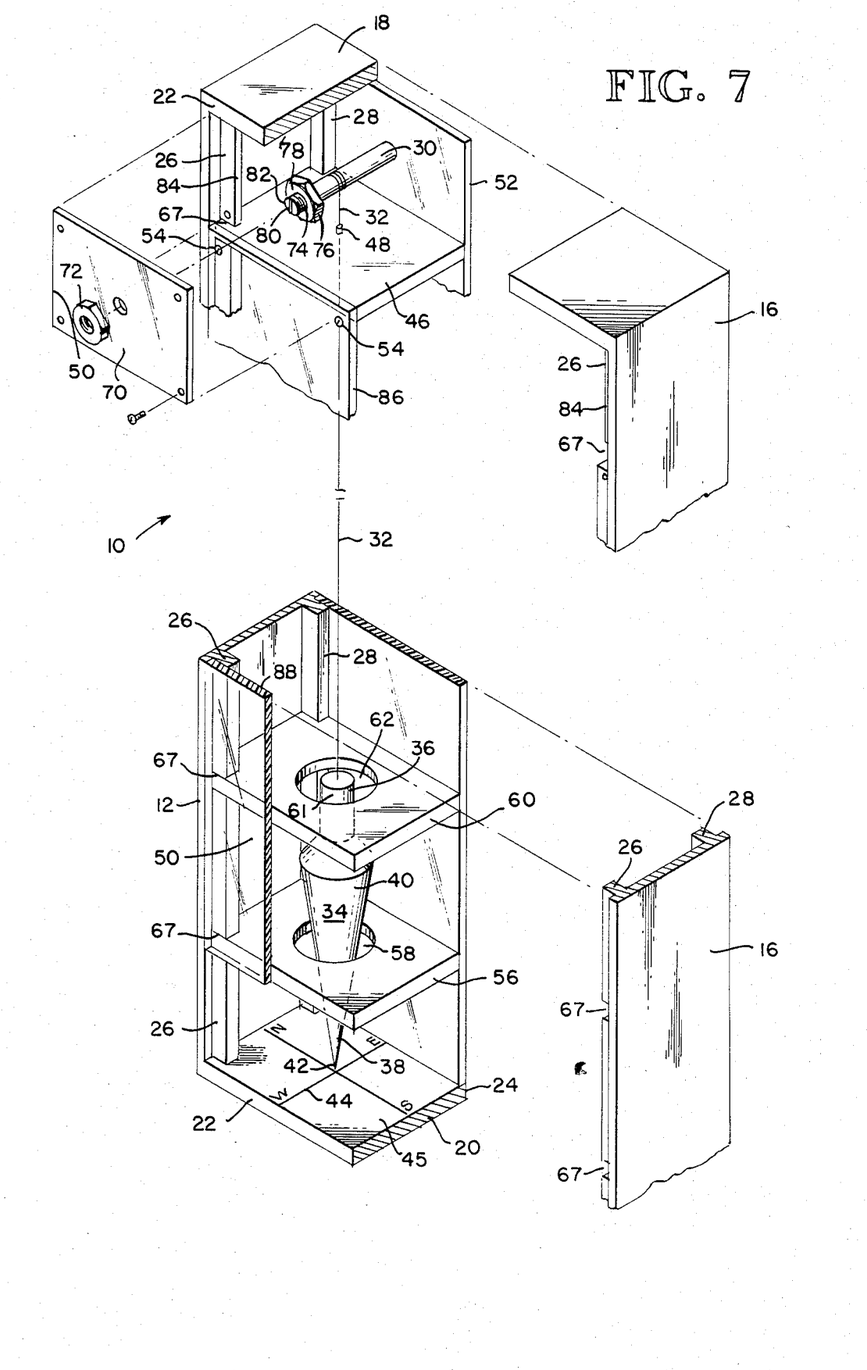
FIG. 7 is an enlarged fragmentary, isometric, exploded view of the plumb bob level of FIG. 1.

As shown in the drawings for purposes of illustration, the present invention is embodied in a plumb bob level, indicated generally by reference numeral 10. The level includes a rigid casing 12 having two parallel, spaced-apart, opposed, elongated sidewalls 14 and 16, each sidewall having a planar exterior surface parallel with the exterior surface of the opposing sidewall. The sidewalls 14 and 16 are rigidly connected together by an upper end wall 18 and a lower end wall 20 positioned at the longitudinal ends of the sidewalls. The end walls 18 and 20 each have a planar exterior surface oriented perpendicular to both of the sidewall exterior surfaces. The sidewalls 14 and 16 and the end walls 18 and 20 each have two opposed, parallel, planar, exterior edge surfaces oriented perpendicular to the sidewall and end wall exterior surfaces, and defining outwardly facing, planar front and rear surfaces 22 and 24, respectively. Each of the sidewalls 14 and 16 has a pair of spaced-apart, longitudinally extending, interior front and rear flanges 26 and 28, respectively, recessed inwardly from the sidewall exterior edge surfaces.

A shaft or bobbin 30 is positioned and rotatably supported toward the upper end wall 18 and has a flexible line 32 attached thereto and wrapped therearound. A free end of the line 32 is inserted in a bore hole 33 in the shaft 30 and fixed therein by a recessed set screw 35. The line 32 extends longitudinally within the casing 12 toward the lower end wall 20. The shaft 30 is selectively rotatable for adjusting the length of the line 32 extending from the shaft, as will be described in more detail below.

An elongated plumb bob 34 is provided having a longitudinal upper end portion 36 and a longitudinal lower end portion 38, and an enlarged midportion 40 therebetween. The upper end portion 36 of the plumb bob 34 is secured to an end of the line 32 at a position toward the lower end wall 20 and thereby suspended from the shaft 30. The plumb bob 30 tapers downwardly from the midportion 40 to a pointed tip 42 at the lower end portion 38 of the plumb bob 34 positionable in proximity with a cross-hair-type target 44 formed on an interior surface 45 of the lower end wall 20. The cross hairs may be formed by a pair of perpendicularly crossed lines scribed, cut, etched or otherwise formed on the lower end wall 20, and actual cross hairs may be used if desired. The plumb bob 34 is free-swinging for movement in all directions responsive to the angular orientation of the casing 12 with respect to true vertical, and can be used to simultaneously, from a single reading, determine if two perpendicularly oriented surfaces, such as a corner, are plumb. A pair of plumb or truly vertically oriented surfaces will position the plumb bob pointed tip 42 dead-center with the cross-hair target, and if not dead-center, the single reading indicates which of the two surfaces is not plumb based on the direction the plumb bob 30 is positioned away from the target's center.

A guide plate 46 is positioned toward the upper end wall 18 below the shaft 30 and extends between the sidewalls 14 and 16 for maintaining the spacing therebetween. The guide plate 46 has a bore hole aperture 48 laterally aligned with the center of the cross-hair-type target 44 and having the line 32 extending through the bore hole aperture to maintain the line laterally centered within the casing 12 relative to the target, regardless of the position of the line on the shaft and how it is being fed off the shaft. The bore hole aperture 48 is sized large enough to provide free passage of the line 30 therethrough, but small enough to substantially inhibit lateral movement of the line therein. For use with a conventional thickness, flexible bob-line, the bore hole aperture is approximately 1/16 inch in diameter.

Transparent front and rear face plates 50 and 52, respectively, are attached to the casing 12 and positioned against the flanges 26 and 28, with an outward surface of the face plates being positioned substantially coplanar with the respective front and rear casing surfaces 22 and 24, except for an upper portion of the front face plate, which will be described below. The face plates 50 and 52 extend between the sidewalls 14 and 16 and are removably attached to the flanges 26 and 28 by removable fasteners 54. As will also be described below, the face plates 50 and 52 at least partially enclose the casing 12 while permitting substantially uninhibited viewing of the plumb bob 34, the shaft 30, the line 32, and the target 44.

A first gusset plate 56 is positioned toward the lower end wall 20 and intermediate the plumb bob upper and lower end portions 36 and 38. The first gusset plate 56 extends between the sidewalls 14 and 16 for maintaining the spacing therebetween and has an aperture 58 with the plumb bob 34 positioned therein. The aperture 58 is sized large enough to permit free-swinging of the plumb bob 34 during normal usage of the level, but small enough to prevent the plumb bob from swinging into contact with the sidewalls 14 and 16 or the face plates 50 and 52.

A second gusset plate 60 is positioned intermediate the first gusset plate 56 and the plumb bob upper end portion 36, above the enlarged plumb bob midportion 40. Between the plumb bob upper end portion 36 and midportion 40, the plumb bob has a generally cylindrically shaped, elongated neck portion 61. The second gusset plate 60 extends between the sidewalls 14 and 16 for maintaining the spacing therebetween and has an aperture 62 with the plumb bob 34 positioned therein. The aperture 62 is sized large enough to permit free-swinging of the plumb bob 34 during normal usage of the level, but small enough to prevent the plumb bob midportion 40 from passing therethrough when the level is inverted. The neck portion 61 has sufficient length to permit adequate adjustment of the length of the line 32 without the enlarged plumb bob midportion 40 hitting the second gusset plate 60. In such manner, the first and second gusset plates 56 and 60 cradle and restrict the movement of the plumb bob 34 to prevent it from damaging the casing 12 or the face plates 50 and 52 as the plumb bob swings during usage or as it moves about within the casing 12 as the level 10 is transported or stored on its side or in an inverted position.

In the presently preferred embodiment of the invention illustrated in the drawings, the casing 12 is formed as an integral unit, preferably of a light yet durable metal, such as aluminum, which is substantially unaffected by dampness and temperatures changes. The integral metal construction substantially eliminates warpage and distortion of the casing 12, and permits usage and storage of the level 10 in all environments. As previously described, the guide plate 46 and the first and second gusset plates 56 and 60 extend between the sidewalls 14 and 16 to provide additional lateral rigidity to the casing 12. For additional lateral rigidity, the level 10 is provided with longitudinally spaced-apart third and fourth gusset plates 64 and 66, respectively, positioned between the guide plate 46 and the second gusset plate 60.

The third and fourth gusset plates 64 and 66 each extend between the sidewalls 14 and 16 for maintaining the spacing therebetween and have an aperture 68 with the line 32 extending therethrough. The aperture 68 is sized large enough to permit uninhibited movement of the line 32 as the plumb bob 34 swings free during normal usage. Some additional lateral rigidity against movement of the sidewalls 14 and 16 in the outward direction is provided by the front and rear face plates 50 and 52, which are attached to the casing 12 by the plurality of fasteners 54 at various positions along the length of the casing.

The guide plate 46 and the first, second, third, and fourth gusset plates 56, 60, 64, and 66 are slidably and supportably retained within laterally extending slots 67 in the flanges 26 and 28. It is noted that while in the presently preferred embodiment of the invention the guide plate 46 and the third and fourth gusset plates 64 and 66 are formed as separate components of the level 10, one or more of these plates may be formed as an integral part of the casing 12 to achieve increased lateral rigidity against outward movement of the sidewalls 14 and 16.

The rear face plate 52 extends the entire length of the casing 12 between the upper and lower end walls 18 and 20, and is held with its outward surface substantially coplanar with the rear casing surface 24 by the rear flanges 28 of the sidewalls 14 and 16. The fasteners 54 extend through the rear face plate 52 and are threadably fastened to the flanges 28. The fasteners 54 are positioned flush in countersunk holes in the rear face plate 52 to provide a smooth rear profile for the level 10. The rear face plate 52 overlaps the rear edges of the guide plate 46 and the first, second, third, and fourth gusset plates 56, 60, 64, and 66, and serves to maintain the plates in their respective slots 67 in the flanges 26 and 28 against rearward movement.

The front face plate 50 has an upper, separately removable section 70 extending from the upper end wall 18 to the upper surface of the guide plate 46. The upper plate section 70 and the rear face plate 52 have correspondingly positioned apertures therein to receive and rotatably support the shaft 30. The shaft 30 is selectively locked against rotation by a first lock nut 72 positioned exterior of the upper plate section 70 and threadably attached to a threaded end portion 74 of the shaft. A second lock nut 76 is positioned interior of the upper plate section 70 and is also threadably attached to the threaded end portion 74 of the shaft 30, with a thin washer 78 positioned between the second lock nut 76 and the interior face of the upper plate section. With the first lock nut 72 loosened, the shaft may be selectively rotated by a slot 80 in an exterior end face 82 of the shaft 30 using a screw driver or other appropriate device (not shown). The rotation of the shaft 30 will wrap or unwrap the line 32 around the shaft, depending on the direction the shaft is being rotated, to raise or lower the plumb bob 34. It is frequently necessary to adjust the longitudinal position of the plumb bob 34 within the casing 12 to keep the pointed tip 42 at a desired distance above the cross-hair-type target 44 as a result of the line 32 stretching under the weight of the plumb bob during usage and shortening or relaxing when the plumb bob weight is removed during periods of nonusage, such as when the level 10 is stored on its side or in an inverted position. The shaft 30 may be selectively locked against rotation by tightening of the first lock nut 72 to bind the upper plate section between the first and second lock nuts 72 and 76.

To provide a smooth front profile for the level, an upper portion 84 of the front flanges 26 of the sidewalls 14 and 16 are recessed inwardly from the front casing surface 22 sufficiently to appropriately position the upper section 70 to maintain the first lock nut 72 at or inward of the front casing surface 22. The remaining length of the flanges 26 below the upper portion 84 is positioned outward therefrom and recessed from the front casing surface 22 only a sufficient distance to position the outward surface of the remaining sections of the front face plate 50, which will be described below, coplanar with the front case surface. As with the rear face plate 52, the fasteners 54 extend through the front face plate 50 and are threadably fastened to the flanges 26. The fasteners 54 are positioned flush in countersunk holes in the front face plate 50 to provide the smooth front profile.

The front face plate 50 has a separate midsection 86 extending from a position at the upper surface of the guide plate 46 to a position above the second gusset plate 60. The plate midsection 86 extends to overlap the front edges of the guide plate 46 and the third and fourth gusset plates 64 and 66 to maintain the plates in their respective slots 67 in the flanges 26 and 28 against forward movement. While the midsection 86 is described herein as being removably attached to the casing 12, it may be fixedly attached thereto, as may the rear face plate 52, if desired, using an adhesive or any other means.

In addition to the upper section 70 and midsection 86, the front face plate 50 has a lower removable section 88 extending from a position above the second gusset plate 60, adjacent to the plate midsection, to the lower surface of the first gusset plate 56. The lower plate section 88 extends to overlap the front edges of the first and second gusset plates 56 and 60 to maintain the first and second gusset plates in their respective slots 67 against forward movement. The casing 12 is maintained open for easy access to the plumb bob 34 by the user of the level 10 to steady the plumb bob in preparation for use of the level. The open portion below the lower plate section 88 should be approximately two inches in length to provide convenient grasping of the plumb bob 34 between two fingers.

With the lower plate section 88 being removable, the plumb bob 34 may be easily and quickly removed for replacement or inspection merely by removing the lower plate section and sliding the first and second gusset plates 56 and 60 forward and free of the casing 12, with the plumb bob 34 still retained within apertures 58 and 62. To reassemble the level 10, the steps are merely reversed. The first and second gusset plates 56 and 60 are reinserted into the slots 67 in the flanges 26 and 28, with the plumb bob positioned in the apertures 58 and 62, and then the lower plate section 88 is reattached to the flanges 26 with the removable fasteners 54.

In the presently preferred embodiment of the invention, the guide plate 46 and the first, second, third, and fourth gusset plates 56, 60, 64 and 66 are transparent to permit the user substantially uninhibited viewing into the casing 12 to see the shaft 30, the line 32, the plumb bob 34, and the cross-hair-type target 44.

It will be appreciated that, although specific embodiments of the invention have been described herein for purposes of illustration, various modifications may be made without departing from the spirit and scope of the invention. Accordingly, the invention is not limited except as by the appended claims.

I claim:

1. A plumb bob level comprising:
   a rigid metallic casing having two parallel, spaced-apart, opposed elongated sidewalls, each of said sidewalls having a planar exterior surface parallel with said exterior surface of the opposing sidewall, said sidewalls being rigidly connected together by an upper end wall and a lower end wall positioned at the longitudinal ends of said sidewalls, said end walls each having a planar exterior surface oriented perpendicular to both of said sidewall exterior surfaces, said sidewalls and end walls each having two opposed, parallel, planar exterior edge surfaces oriented perpendicular to said sidewall and end wall exterior surfaces and defining outwardly facing, planar front and rear surfaces, each of said sidewalls having a pair of spaced-apart, longitudinally extending, interior flanges recessed inward from said sidewall exterior edge surfaces;
   a shaft positioned and rotatably supported toward said upper end wall and having a flexible line attached thereto and extending longitudinally within said casing toward said lower end wall, said shaft being selectively rotatable for adjusting the length of said line extending from said shaft;
   an elongated plumb bob with longitudinal upper and lower end portions and an enlarged midportion therebetween, said upper end portion being secured to said line toward said lower end wall for suspension from said shaft and positioning of a pointed tip of said lower end portion in proximity and alignment with a cross-hair-type target formed on an interior surface of said lower end wall, said plumb bob being free-swinging for movement in all directions responsive to the angular orientation of said casing with respect to true vertical;
   a guide plate positioned toward said upper end wall below said shaft and extending between said sidewalls for maintaining the spacing therebetween, said guide plate having an aperture laterally aligned with said target and having said line extending through said aperture to maintain said line laterally centered within said casing relative to said target, regardless of the position of said line on said shaft, said aperture being sized large enough to permit free passage of said line therethrough but small enough to substantially limit lateral movement of said line therein;
   transparent front and rear face plates attached to said casing in position against said flanges, with an outward surface of said face plates being positioned at or inward of said respective front and rear casing surfaces, said face plates extending between said sidewalls and at least partially enclosing said casing while permitting substantially uninhibited viewing of the plumb bob, shaft, line and target;

a transparent first gusset plate positioned toward said lower end wall and intermediate said plumb bob upper and lower end portions, said first gusset plate extending between said sidewalls for maintaining the spacing therebetween and having an aperture with said plumb bob positioned therein, said aperture being sized large enough to permit free-swinging of said plumb bob during normal usage but small enough to prevent said plumb bob from swinging into contact with said sidewalls or face plates; and a transparent second gusset plate positioned intermediate said first gusset plate and said plumb bob upper end portion, above said plumb bob midportion, said second gusset plate extending between said sidewalls for maintaining the spacing therebetween and having an aperture with said plumb bob positioned therein, said aperture being sized large enough to permit free-swinging of said plumb bob during normal usage but small enough to prevent said plumb bob midportion from passing therethrough when the level is inverted.

2. The plumb bob level of claim 1 wherein said guide plate and said first and second gusset plates are supportably retained within laterally extending slots in said flanges.

3. The plumb bob level of claim 1 wherein said casing is formed as an integral unit.

4. The plumb bob level of claim 1 wherein said rear face plate extends the entire length of said casing between said upper and lower end walls.

5. The plumb bob level of claim 4 wherein said flanges hold said outward surface of said rear face plate substantially coplanar with said rear casing surface.

6. The plumb bob level of claim 1 wherein said flanges hold at least a portion of said outward surface of said front face plate substantially coplanar with said front casing surface.

7. The plumb bob level of claim 1 wherein said front face plate has an upper removable section extending from said upper end wall to said guide plate.

8. The plumb bob level of claim 7 wherein said shaft extends through and is rotatably supported by said upper plate section, said shaft being selectively locked against rotation by a lock nut positioned exterior of said upper plate section and threadably attached to a threaded end portion of said shaft.

9. The plumb bob level of claim 8 wherein said shaft has a second lock nut positioned interior of said upper plate section and threadably attached to said shaft threaded end portion to bind said upper plate section between said exterior and interior lock nuts to selectively allow rotation of said shaft for adjusting said line length, said shaft having an exterior end face slotted for turning of said shaft.

10. The plumb bob level of claim 8 wherein said shaft is received in and rotatably supported by an aperture in said rear face plate.

11. The plumb bob level of claim 8 wherein at least an upper portion of said sidewall flanges, located toward said front casing surface against which said upper plate section is positioned, is recessed inward of said front casing surfaces sufficiently to maintain said lock nut at or inward of said front casing surface, and said upper plate section extends downward to immediately above said guide plate.

12. The plumb bob level of claim 11 wherein said front face plate has a midsection extending from said guide plate to a position above said second gusset plate.

13. The plumb bob level of claim 12 wherein said front face plate has a lower removable section extending from a position above said second gusset plate, adjacent to said plate midsection, to said first gusset plate, and said casing below said lower plate section is maintained open for easy access to said plumb bob by the user of the level to steady said plumb bob in preparation for use.

14. The plumb bob level of claim 13 wherein gusset plates are slidably retained within laterally extending slots in said flanges, and said lower plate section extends to overlap a front edge of said first and second gusset plates to maintain said first and second gusset plates in said slots.

15. The plumb bob level of claim 11 wherein a midportion of said sidewall flanges toward said front casing surface and against which said plate midsection is positioned, is located outward of said upper flange portions, and said guide plate is slidably retained within laterally extending slots in said flange and said plate midsection extends to overlap a front edge of said guide plate to maintain said guide plate in said slots.

16. The plumb bob level of claim 1 wherein said aperture in said guide plate is a bore hole.

17. The plumb bob level of claim 16 wherein said bore hole is approximately 1/16 inch in diameter.

18. The plumb bob level of claim 1, further including longitudinally spaced-apart, transparent third and fourth gusset plates positioned between said guide plate and said second gusset plate, said third and fourth gusset plates each extending between said sidewalls for maintaining the spacing therebetween and having an aperture with said line extending therethrough, said aperture being sized large enough to permit uninhibited movement of said line as said plumb bob swings free during normal usage.

19. A plumb bob level comprising:
a casing having two parallel, spaced-apart, elongated sidewalls, said sidewalls being rigidly connected together by an upper end wall and a lower end wall, at least said lower end wall being positioned at the longitudinal end of said sidewalls and oriented perpendicular to both of said sidewalls, said sidewalls and at least said lower end wall each having two opposed, parallel edges defining outwardly facing front and rear surfaces perpendicular to said sidewalls and at least said lower end wall;

a bobbin positioned below and adjacent to said upper end wall and having a flexible line wrapped therearound and extending longitudinally within said casing toward said lower end wall, said bobbin being selectively rotatable to adjust the the length of said line;

an elongated plumb bob with longitudinal upper and lower end portions and an enlarged midportion therebetween, said upper end portion being secured to said line toward said lower end wall for suspension from said bobbin and positioning of a pointed tip of said lower end portion in proximity and alignment with a target formed on an interior surface of said lower end wall, said plumb bob being free-swinging for movement in all directions responsive to the angular orientation of said casing with respect to true vertical;

a guide plate positioned toward said upper end wall below said bobbin and extending between said sidewalls for maintaining the spacing therebetween, said guide plate having an aperture laterally aligned with said target and having said line extending through said aperture to maintain said line laterally centered within said casing relative to said target when said line is fed off-center from said bobbin, said aperture being sized large enough to permit free passage of said line therethrough but small enough to substantially inhibit lateral movement of said line therein;

front and rear face plates attached to said casing and extending between said sidewalls to at least partially enclose said casing, at least one of said face plates being transparent to permit substantially uninhibited viewing into said casing;

a first gusset plate positioned toward said lower end wall and intermediate said plumb bob upper and lower end portions, said first gusset plate extending between said sidewalls for maintaining the spacing therebetween and having an aperture with said plumb bob positioned therein, said aperture being sized large enough to permit free-swinging of said plumb bob during normal usage but small enough to prevent said plumb bob from swinging into contact with said sidewalls or face plates; and a second gusset plate positioned intermediate said first gusset plate and said plumb bob upper end portion, above said plumb bob midportion, said second gusset plate extending between said sidewalls for maintaining the spacing therebetween and having an aperture with said plumb bob positioned therein, said aperture being sized large enough to permit free-swinging of said plumb bob during normal usage but small enough to prevent said plumb bob midportion from passing therethrough when the level is inverted.

20. A plumb bob level comprising:

a rigid casing having two parallel, spaced-apart, elongated sidewalls, and spaced apart upper and lower end walls, at least said lower end wall being positioned at the longitudinal end of said sidewalls and oriented perpendicular to both of said sidewalls, said sidewalls and at least said lower end wall each having two opposed parallel edges defining outwardly facing front and rear surfaces perpendicular to said sidewalls and at least said lower end wall;

a plumb bob suspension means positioned toward said upper end wall for supporting a bob-line extending longitudinally therefrom within said casing toward said lower end wall;

an elongated plumb bob with longitudinal upper and lower end portions, said upper end portion being suspended from said bob-line at a position toward said lower end wall for positioning of a pointed tip of said lower end portion in proximity and alignment with a target formed on an interior surface of said lower end wall, said plumb bob being free-swinging for movement in all directions responsive to the angular orientation of said casing with respect to true vertical;

front and rear face plates attached to said casing and extending between said sidewalls to at least partially enclose said casing, at least one of said face plates being transparent to permit substantially uninhibited viewing into said casing;

a first retainer member positioned toward said lower end wall and intermediate said plumb bob upper and lower end portions, said first retainer member having an aperture with said plumb bob positioned therein, said aperture being sized large enough to permit free-swinging of said plumb bob during normal usage but small enough to prevent said plumb bob from swinging into contact with said sidewalls or face plates; and a second retainer member positioned above said first retainer member and having an aperture sized large enough to permit free-swinging of said plumb bob during normal usage but small enough to prevent said plumb bob from passing therethrough when the level is inverted.

21. The plumb bob level of claim 20, further including a guide member positioned toward said upper end wall below said suspension means, said guide member having an aperture laterally aligned with said target and having said bob-line extending through said aperture to maintain said bob-line laterally centered within said casing relative to said target, said aperture being sized large enough to permit free passage of said bob-line therethrough but small enough to substantially inhibit lateral movement of said line therein.

22. The plumb bob level of claim 21 wherein said upper and lower end walls rigidly connect said sidewalls together, and said first and second retainer members and said guide member extend between said sidewalls for maintaining the spacing therebetween.

23. The plumb bob level of claim 21 wherein said front face plate is transparent and has an upper removable section extending substantially from said upper end wall to at least said guide member.

24. The plumb bob level of claim 23 wherein said front face plate has a midsection extending from a position adjacent to said upper plate section to a position above said second retainer member.

25. The plumb bob level of claim 24 wherein said front face plate has a lower removable section extending from a position above said second retainer member, adjacent to said plate midsection, to said first retainer member, and said casing below said lower plate section is maintained open for easy access to said plumb bob by the user of the level to steady said plumb bob in preparation for use.

26. The plumb bob level of claim 23 wherein said plumb bob suspension means is a shaft having said bob-line wrapped therearound, said shaft extending through and being rotatably supported by said upper plate section, said shaft being selectively locked against rotation by a lock nut positioned exterior of said upper plate section and threadably attached to a threaded end portion of said shaft, said shaft having means for rotating said shaft from the exterior of the casing upon loosening of said lock nut.

27. The plumb bob level of claim 26 wherein said upper plate section is recessed inward of said front casing surface sufficiently to maintain said lock nut at or inward of said front casing surface.

28. The plumb bob level of claim 20 wherein said plum bob suspension means further provides means for selectively adjusting the longitudinal position of said plumb bob within said casing.

29. The plumb bob level of claim 20 wherein said plumb bob has an enlarged midportion between said upper and lower end portions, and said second retainer member is positioned intermediate said plumb bob upper end portion and midportion, with said plumb bob positioned in said second retainer member aperture and said aperture sized to prevent said plumb bob midportion from passing therethrough when the level is inverted.

30. The plumb bob level of claim 20 wherein each of said sidewalls further includes a pair of spaced-apart, longitudinally extending, interior flanges recessed inward from said sidewall edge surfaces and against which said front and rear face plates are positioned.

31. The plumb bob level of claim 30 wherein said first and second retainer members are supportably retained within laterally extending slots in said flanges.

32. The plumb bob level of claim 20 wherein both said front and rear face plates and both said first and second retainer members are transparent.

33. The plumb bob level of claim 20 wherein said front and rear face plates each have an outward surface positioned substantially coplanar with said front and rear casing surfaces, respectively.

* * * * *